US012799355B2

(12) United States Patent
McClung et al.

(10) Patent No.: US 12,799,355 B2
(45) Date of Patent: Nov. 17, 2026

(54) WATER-BASED RADIATION-CURABLE COMPOSITION FOR SOFT FEEL APPLICATIONS

(71) Applicant: ALLNEX USA INC., Alpharetta, GA (US)

(72) Inventors: Jennifer McClung, Villa Rica, GA (US); Marcus Hutchins, Hram, GA (US); Elodie Siband, Uccle (BE)

(73) Assignee: ALLNEX USA INC., Alpharetta, GA (US)

( * ) Notice: Subject to any disclaimer, the term of this patent is extended or adjusted under 35 U.S.C. 154(b) by 199 days.

(21) Appl. No.: 18/570,256

(22) PCT Filed: Jun. 9, 2022

(86) PCT No.: PCT/US2022/032830

§ 371 (c)(1),
(2) Date: Dec. 14, 2023

(87) PCT Pub. No.: WO2023/278118

PCT Pub. Date: Jan. 5, 2023

(65) Prior Publication Data

US 2024/0279509 A1 Aug. 22, 2024

Related U.S. Application Data

(60) Provisional application No. 63/217,989, filed on Jul. 2, 2021.

(30) Foreign Application Priority Data

Jul. 20, 2021 (EP) .................................... 21186589

(51) Int. Cl.

| | |
|---|---|
| ***C09D 175/16*** | (2006.01) |
| ***C08G 18/08*** | (2006.01) |
| ***C08G 18/32*** | (2006.01) |
| ***C08G 18/42*** | (2006.01) |
| ***C08G 18/67*** | (2006.01) |
| ***C08G 18/72*** | (2006.01) |

(52) U.S. Cl.
CPC ....... *C09D 175/16* (2013.01); *C08G 18/0823* (2013.01); *C08G 18/3228* (2013.01); *C08G 18/4216* (2013.01); *C08G 18/722* (2013.01)

(58) Field of Classification Search
None
See application file for complete search history.

(56) References Cited

U.S. PATENT DOCUMENTS

| | | | | |
|---|---|---|---|---|
| 5,422,186 A | 6/1995 | Biggeleben et al. | | |
| 2004/0034146 A1* | 2/2004 | Gertzmann | C09D 5/20 | 524/507 |
| 2005/0222304 A1* | 10/2005 | Costa | C09D 7/69 | 524/35 |

FOREIGN PATENT DOCUMENTS

| | | |
|---|---|---|
| DE | 40 16 713 | 11/1991 |
| JP | 2010-17657 | 1/2010 |
| JP | 2010-18714 | 1/2010 |
| WO | 2008/101661 | 8/2008 |

OTHER PUBLICATIONS

International Preliminary Report on Patentability and Written Opinion mailed Jan. 11, 2024, in International Application No. PCT/US2022/032830.
International Search Report (ISR) issued Aug. 25, 2022 in International (PCT) Application No. PCT/US2022/032830.
Saunders-Frisch et al., "Polyurethanes, Chemistry and Technology", High Polymers, vol. XVI, Interscience Publishers, vol. I, pp. 32-42 and pp. 44-54, 1962 and vol. II, pp. 5-6 and 198-199, 1964, cited in the specification.
Kunststoff-Handbuch, vol. VII, Vieweg-Hochtlen, Carl-Hanser-Verlag, Munich, e.g. on pp. 45 to 71, 1966, together with English translation thereof, cited in the specification.

* cited by examiner

*Primary Examiner* — Sheeba Ahmed
(74) *Attorney, Agent, or Firm* — Wenderoth, Lind & Ponack, L.L.P.

(57) ABSTRACT

An aqueous radiation-curable composition comprising a radiation-curable polyurethane dispersion obtained by reacting: a. a compound comprising at least two isocyanate groups, b. a polyol having a molecular weight of at least 500 g/mol, c. a compound comprising at least one group capable of reacting with an isocyanate group, and at least one hydrophilic group. and d. an ethylenically unsaturated compound comprising at least 10 one group capable of reacting with an isocyanate group, and at least one ethylenically unsaturated group, and a plurality of polyurethane particles having a median particle diameter D50 of from 1 to 10 μm, and water.

17 Claims, No Drawings

WATER-BASED RADIATION-CURABLE COMPOSITION FOR SOFT FEEL APPLICATIONS

FIELD OF THE INVENTION

The present invention relates to a water-based radiation-curable composition, a coating comprising said composition, a method for forming the composition, a method for forming the coating, and the use of the coating in the field of coating applications, more in particular in the field of soft feel applications, such as for use in automotive interiors.

BACKGROUND OF THE INVENTION

Coatings protect surfaces from deterioration that may be due to chemicals and/or abrasion. Soft feel coatings may have the further ability to transform the sometimes uninviting feel of the surface (for example, a plastic surface) into a comfortable rubber-, leather- or velvet-like sensation. Thereby, manufacturers may use relatively inexpensive materials, such as plastics, and apply a coating, to give it the appearance of a high-end luxury item. The coating may provide high quality and even luxurious appearance to consumers. There is an increasing demand for soft-feel coatings. Such coatings may be used in a large number of applications, including consumer electronics (e.g., notebooks, mobile phone casings), appliances (e.g., ovens, coffee machines), automotive interiors (e.g., panels, holders, arm rests), packaging (e.g., cosmetic bottles/caps, bags), and textured films for in-mold decoration/in-mold labeling (IMD/IML).

Present soft feel coatings used in automotive may be formed from a two-component conventional waterborne composition. Such soft feel coatings typically do not have the chemical resistance that may be needed, specifically towards sunscreen and insect repellants (e.g., N, N-diethyl-meta-toluamide, that is, DEET). Instead, the needed chemical resistance is provided by a primer layer that is present underneath the soft feel coating. Providing the primer layer requires additional time and costs.

Solvent-based curable compositions (the solvent typically being a volatile organic compound) are available on the market (such as commercial compositions EBECRYL® 8896 and EBECRYL® 8894). However, solvent-based compositions typically do not offer the soft feeling targeted in automotive interiors. Furthermore, coatings formed therefrom do not pass the needed chemical tests, i.e., do not have the needed chemical resistance.

Solvent-based curable compositions also suffer from regulatory aspects. For example, the solvent is typically a volatile organic compound, which is not preferred from the perspective of sustainability.

The market is currently looking for an improvement to conventional coatings, because of the poor chemical and scratch-resistance of existing coatings. The introduction of waterborne UV technology could revolutionize the soft-touch market.

There remains therefore a need in the art for aqueous coating compositions having good soft-feel properties and chemical resistance.

DESCRIPTION OF THE INVENTION

It is hence an object of the present invention to develop radiation-curable compositions, and coatings formed from said compositions, that overcome at least partially some of the above drawbacks.

The composition according to embodiments of the present invention, and the coating formed from said composition, may have one or more of the following advantages:

- Embodiments of the composition may be easy to apply, for example, compared to two-component waterborne compositions of the state of the art. In particular, there may be no need to apply a primer layer to a surface before application of the composition to the surface. The process for applying the composition may therefore be easy and cost-efficient. Advanced equipment, such as a two-component spray gun, is typically not needed to apply the composition.
- Volatile organic compounds (e.g., organic, solvent) are typically not required in the composition. Furthermore, the amount of unreacted, i.e., free, isocyanate groups in the composition may be low. This may make the composition a sustainable and safe choice from a regulatory point of view. Furthermore, the absence of reactive free isocyanate groups typically increases the lifetime, i.e., pot life, of the composition.
- Due to the potential increase in lifetime, i.e., pot life, of the composition, larger batches may be prepared. This may result in further cost reduction.
- The composition may have a good spraying viscosity. Furthermore, the coating may be formed from the composition at a low temperature.
- Unlike conventional water-based compositions, embodiments of the composition of the present invention may be free from formaldehyde, alkylphenol ethoxylate (APEO), N-methylpyrrolidone (NMP), or N-ethylpyrrolidone (NEP).
- Since the composition is radiation-curable, the time required for curing the composition to form the coating may be short. For example, a time in the order of seconds or less, instead of in the order of hours, may be needed for said curing.
- The composition can provide a coating having a soft feel. Furthermore, the compositions can provide coatings with a good chemical stability and good to excellent chemical resistance, in particular against sunscreen and insect repellants, such as N,N-diethyl-meta-toluamide (DEET).
- The compositions according to the present invention may provide coatings having good adhesion properties.

In a first aspect, the present invention relates to an aqueous radiation-curable composition comprising a radiation-curable polyurethane water dispersion, also called radiation-curable polyurethane dispersion, obtained by reacting: a. a compound comprising at least two isocyanate groups, b. a polyol having a molecular weight of at least 500 g/mol, c. a compound comprising at least one group capable of reacting with an isocyanate group, and at least one hydrophilic group preferably comprising a salt, or capable of comprising a salt after reaction with a neutralizing agent, and d. an ethylenically unsaturated compound comprising at least one group capable of reacting with an isocyanate group, and at least one ethylenically unsaturated group, and a plurality of polyurethane particles that are not-radiation curable and have a median particle diameter D50 of from 1 to 10 μm, and water.

In a second aspect, the present invention relates to a coating formed by curing the composition according to embodiments of the first aspect.

In a third aspect, the present invention relates to a method for forming the coating according to embodiments of the second aspect, comprising applying the composition according to embodiments of the first aspect to a surface, and curing the composition, thereby forming the coating.

In a fourth aspect, the present invention relates to a use of the coating according to embodiments of the second aspect, for consumer electronics, appliances, automotive interiors and exteriors, packaging, furniture, in-mold decoration, industrial applications, graphical applications, or in-mold labeling.

In a fifth aspect, the present invention relates to a method for forming an aqueous radiation-curable composition according to any embodiments of the first aspect of the present invention comprising mixing a radiation-curable polyurethane dispersion compound obtained by reacting: a. a compound comprising at least two isocyanate groups, b. a polyol having a molecular weight of at least 500 g/mol, c. a compound comprising at least one group capable of reacting with an isocyanate group, and at least one hydrophilic group preferably comprising a salt, or capable of comprising a salt after reaction with a neutralizing agent, and d. an ethylenically unsaturated compound comprising at least one group capable of reacting with an isocyanate group, and at least one ethylenically unsaturated group, and a plurality of polyurethane particles that are not-radiation curable and have a median diameter D50 of from 1 to 10 μm, and water.

In the context of the present invention, an ethylenically unsaturated compound is a compound having at least one ethylenically unsaturated functionality. The ethylenically unsaturated functionality is typically suitable for undergoing radical polymerization, i.e., free-radical polymerization. In the context of the present invention, "ethylenically unsaturated functionality" may designate a group with at least one carbon-carbon double bond, i.e., a π bond, which under the influence of irradiation and/or an activated (photo)initiator can undergo radical polymerization. The polymerizable ethylenically unsaturated functionalities are generally chosen from allyl groups, vinyl groups, and (meth)acryloyl groups. Double bonds may come, instead or in addition, from, for example, unsaturated acids, unsaturated fatty acids, or acrylamides. In preferred embodiments, the ethylenically unsaturated compound is a (meth)acrylated compound. Herein, the (meth)acrylated compound is a compound comprising one or more (meth)acryloyl groups.

In the context of the present invention, the term (meth) acryl compounds may be understood to encompass both acrylated compounds and methacrylated compounds or derivatives thereof, as well as mixtures thereof. In the context of the present invention, the term (meth)acrylate is meant to encompass both acrylate and methacrylate compounds. In preferred embodiments, the (meth)acrylated compound is an acrylated compound. Such compounds may comprise at least one acrylate ($CH_2{=}CHCOO$—) and/or methacrylate ($CH_2{=}CCH_3COO$—) group. Compounds that contain only one (meth)acrylate functionality are preferred.

In the context of the present invention, the term "(meth) acrylic" encompasses that acrylic and/or methacrylic groups are present on a compound either separately or as a mixture of acrylic and methacrylic groups.

In the context of the present invention, a "water-dispersed compound", or "water dispersion" or "dispersion" i.e., a dispersion of a self-water-dispersible compound, is a compound that, when mixed with water, forms a stable two-phase system of small particles dispersed in water without the aid of an additional emulsifier or dispersing agent. A "water-dispersible compound" is a compound that is insoluble in water but that is capable of being dispersed into water without requiring the use of a separate aid such as an emulsifier or dispersing agent and forms a water-dispersed compound (i.e. a water dispersion). That is, upon dispersion, it forms a stable two-phase system of small discrete particles or droplets dispersed in water. For example, in a "polyurethane dispersion", the discrete particles are the polyurethane polymer. The particles are the dispersed or internal phase and the aqueous medium is the continuous or external phase. By "stable" is meant to designate herein that there is substantially no coalescence (droplets) nor flocculation (particles) leading to phase separation, creaming, or sedimentation of the heterogeneous system after 1 day at 60° C., preferably not even after 2 or more days, typically 4 or more days, most preferably not even after 10 days at 60° C.

In the context of the present invention, the term "polyol" indicates a compound comprising two or more hydroxyl groups per molecule.

In the context of the present invention, the term "polyamine" indicates a compound comprising two or more primary or secondary amine groups per molecule.

In a first aspect, the present invention relates to an aqueous radiation-curable composition comprising a radiation-curable polyurethane dispersion obtained by reacting: a. a compound comprising at least two isocyanate groups, b. a polyol having a molecular weight of at least 500 g/mol, c. a compound comprising at least one group capable of reacting with an isocyanate group, and at least one hydrophilic group preferably comprising a salt, or capable of comprising a salt after reaction with a neutralizing agent, and d. an ethylenically unsaturated compound comprising at least one group capable of reacting with an isocyanate group, and at least one ethylenically unsaturated group, and a plurality of polyurethane particles that are not-radiation curable and have a median particle diameter D50 of from 1 to 10 μm, and water.

In embodiments of the first aspect, the radiation-curable polyurethane dispersion is obtained by reacting from 10 to 60 parts by mass of compound a., from 1 to 40 parts by mass of compound b., from 2 to 25 parts by mass of compound c., and from 15 to 85 parts by mass of compound d, wherein the parts by mass of compounds a., b., c., and d. sum up to 100. Preferably, at least 15, such as at least 20, parts by mass of compound a., is present in the reaction. Preferably, at most 50 parts by mass of compound a., and more typically, at most 40 parts by mass of compound a., is present in the reaction. Preferably, from 10 to 50, such as from 20 to 40, parts by mass of compound a. is present in the reaction. In embodiments, at least 80 wt %, preferably at least 85 wt %, more preferably at least 90 wt % of the compounds reacted to form the radiation-curable polyurethane dispersion consists of compounds a., b., c., and d. In embodiments, at least 80 wt %, preferably at least 85 wt %, more preferably at least 90 wt % of the compounds reacted to form the radiation-curable polyurethane dispersion consists of compounds a., b., c., d, e. if present, and f. if present.

In embodiments of the present invention, compound a. comprises an organic compound that comprises at least two, such as from two to six, isocyanate groups. That is, compound a. is a polyisocyanate compound. In embodiments, compound a. comprises only two or three isocyanate groups, preferably only two isocyanate groups. In embodiments, compound a. is selected from aliphatic, cycloaliphatic, aromatic, and/or heterocyclic polyisocyanates or is a combination thereof. In embodiments, compound a. contains an allophanate group, a biuret group, and/or an isocyanurate group.

In embodiments, the aliphatic or cycloaliphatic polyisocyanate is at least one of 1,5 diisocyanatopentane, 1,6-diisocyanatohexane (HDI), 1,1'-methylene bis[4-isocyanatocyclohexane] (H12MDI), 5-isocyanato-1-isocyanatomethyl-1,3,3-trimethyl-cyclohexane (isophorone diisocyanate, IPDI), or pentamethylene diisocyanate (PDI). Aliphatic polyisocyanates containing more than two isocyanate groups are for example the derivatives of above mentioned diisocyanates like 1,6-diisocyanatohexane biuret and isocyanurate. Examples of aromatic polyisocyanates are 1,4-diisocyanatobenzene (BDI), 2,4-diisocyanatotoluene (2,4-TDI), 2,6-diisocyanatotoluene (2,6-TDI), 1,1'-methylenebis[4-isocyanatobenzene] (MDI), xylylene diisocyanate (XDI), tetramethylxylylene diisocyanate (TMXDI), 1,5-naphtalene diisocyanate (NDI), tolidine diisocyanate (TODI) and p-phenylene diisocyanate (PPDI).

Preferably, compound a. comprises an aliphatic or cycloaliphatic polyisocyanate. In preferred embodiments, compound a. comprises an aliphatic or cycloaliphatic diisocyanate, such as a cycloaliphatic diisocyanate. Especially preferred are 1,1'-methylene bis[4-isocyanatocyclohexane] (H12MDI) and/or isophorone diisocyanate (IPDI).

In embodiments, compound a. comprises a mixture of compounds described with respect to compound a.

Preferably, the amount of polyol compound b. used for preparing the radiation-curable polyurethane dispersion is present in an amount of from 1 to 40 parts by mass.

In embodiments, polyol compound b. can be selected from polyols having a number average molecular weight of at least 500 g/mol. In embodiments, compound b. has a number average molecular weight of at most 5,000 g/mol, preferably at most 2,000 g/mol, more preferably at most 1,000 g/mol, as calculated based on the hydroxyl index of the polyol. Herein, the hydroxyl index may be calculated using the formula 56×2×1000/(hydroxyl value of the polyol). In embodiments, polyol compound b. comprises at least one of polyester polyol, polyether polyol, polycarbonate polyol, fatty dimer diol, and polyacrylate polyol, as well as combinations thereof.

In embodiments, the polyether polyol comprises at least one of polyethylene glycol, polypropylene glycol, and polytetramethylene glycol, or bloc copolymers thereof.

In embodiments, the fatty dimer diol is obtained from hydrogenation of a dimer acid, preferably a dimer acid comprising 36 carbon atoms.

In embodiments, the polyacrylate polyol may be formed by a radical polymerization of (meth)acrylic and/or (meth) acrylamide monomers, preferably initiated by a thermal radical initiator. The forming is preferably performed in the presence of a hydroxylated mercaptan. The forming may be followed by end-group transesterification with a diol, such as 1,4-butanediol.

In preferred embodiments of the first aspect, the polyol compound b. is a polyester or a polycarbonate.

Preferably, the polyol compound b. is a polyester polyol. In embodiments, the polyester polyol is a hydroxyl-terminated reaction product of a polyhydric alcohol, preferably a dihydric alcohol, with a polycarboxylic acid, preferably dicarboxylic acid, or their corresponding anhydrides. In embodiments, the polyester polyol is obtained from a ring-opening polymerization of lactones. Preferably, the polycarboxylic acid used for the formation of the polyester polyol is aliphatic, cycloaliphatic, aromatic, and/or heterocyclic and they may be substituted, saturated, or unsaturated. Examples of dicarboxylic acids are succinic acid, glutaric acid, adipic acid, suberic acid, azelaic acid, sebacic acid, dodecanedicarboxylic acid, hexahydrophthalic acid, isophthalic acid, terephthalic acid, ortho-phthalic acid, tetrachlorophthalic acids, 1,5-naphthalenedicarboxylic acid, fumaric acid, maleic acid, itaconic acid, citraconic acid, mesaconic acid, tetrahydrophthalic acid, trimellitic acid, trimesic acid, and pyromellitic acid, or mixtures thereof. The polyester polyol may further contain an air-drying component such as a long-chain unsaturated aliphatic acid, especially a fatty acid dimer.

Preferably, the polyhydric alcohol used for the preparation of the polyester polyol is selected from one or more diols as described for embodiments of diol compound e.

In preferred embodiments, the polyester polyol is made primarily from the polycondensation of (1) neopentyl glycol and of (2) adipic acid and/or isophthalic acid.

In embodiments wherein compound b. is a polycarbonate polyol, compound b. may be the reaction product of a diol such as ethylene glycol, 1,3-propanediol, 1,3-butanediol, 1,4-butanediol, 1,5-pentanediol, 1,6-hexanediol, diethylene glycol, triethylene glycol, dipropylene glycol, tripropylene glycol or tetraethylene glycol, with at least one of the following compounds: a phosgene, a dialkylcarbonate such as a dimethycarbonate, a diarylcarbonate such as diphenylcarbonate, or a cyclic carbonate such as ethylene or propylene carbonate.

In embodiments, compound b. may comprise a mixture of compounds as described with respect to compound b.

Compound c. is typically a compound, such as a saturated organic compound, comprising at least one hydrophilic group capable of rendering the radiation-curable polyurethane dispersible in an aqueous medium. In embodiments, the radiation-curable polyurethane may be directly dispersible, for example when the hydrophilic group is not ionic or is a salt. In alternative embodiments, the radiation-curable polyurethane may be dispersible after the reaction with a neutralizing agent to provide a salt. In embodiments, the hydrophilic group capable of rendering the polyurethane dispersible in an aqueous medium can be ionic or non-ionic. Preferably, the hydrophilic group is an ionic group, more preferably an anionic group, most preferably an acidic group, or a corresponding salt. In embodiments, the acidic group is a carboxylic acid, sulfonic acid, or phosphonic acid group. In embodiments, the salt comprises a counterion and a carboxylate, a sulfonate, or a phosphonate. Examples of suitable counterions for the salt are ammonium, trimethylammonium, triethylammonium, sodium, potassium, lithium, and the like. Non-ionic groups may comprise hydrophilic moieties including polyethyleneoxide, polypropyleneoxide, or block copolymers made therefrom. Preferably, the hydrophilic group comprises a carboxylic acid group and/or salts thereof. Compound c. is typically a hydrophilic compound.

In embodiments, the at least one group capable of reacting with an isocyanate group may be selected from the list consisting of hydroxyl groups, primary amino groups, and secondary amino groups. In embodiments, compound c. is a hydroxylated and/or aminated compound. In embodiments, compound c. contains at least one, preferably a least two, hydroxyl group or at least one, preferably a least two, primary or secondary amino group.

In preferred embodiments, compound c. comprises a saturated hydroxycarboxylic acid containing at least one hydroxyl group and at least one carboxylic acid group. In embodiments, the number of hydroxyl groups in compound c. is two or three. In embodiments, the number of carboxylic acid groups in compound c. is at most three.

Preferably, the hydroxycarboxylic acid is a saturated aliphatic hydroxycarboxylic acid having at least one hydroxyl group. Preferably, compound c. comprises an aliphatic saturated mono-, di- and/or tri-carboxylic acid, or a mixture thereof, having at least one hydroxyl group per molecule.

In preferred embodiments, compound c. comprises an aliphatic saturated mono-carboxylic acid containing at least one, such as at least two hydroxyl groups. In embodiments, the saturated aliphatic hydroxycarboxylic acid is represented by the general formula $(HO)_xR(COOH)_y$. R represents a straight or branched hydrocarbon moiety having from 1 to 12 carbon atoms. x is an integer from 1 to 3. y is an integer from 1 to 3. In embodiments, the sum of x+y is at most 5. In embodiments, the hydroxycarboxylic acid comprises at least one of citric acid, maleic acid, lactic acid or tartaric acid. Preferably, y=1 in the above general formula. In preferred embodiments, the hydroxycarboxylic acid comprises an α,α-dimethylolalkanoic acid, wherein x=2 and y=1 in the above general formula, such as 2,2-dimethylolpropionic acid and/or 2,2-dimethylolbutanoic acid.

Compound c. may comprise at least one of the compounds c as discussed above. Compound c. may comprise a mixture of at least two of the compounds c as discussed above.

In embodiments, the aqueous radiation-curable composition of the invention is an aqueous dispersion. In embodiments, compound c. is used in an amount sufficient to render the radiation-curable polyurethane water-dispersible. In embodiments, the amount of compound c. used for the synthesis of radiation-curable polyurethane dispersion is in a range of from 2 to 25 parts by mass, wherein the parts by mass of compounds a., b., c., and d. sum up to 100. In embodiments wherein the hydrophilic group is an ionic group, the amount of compound c. is preferably in the range of from 3 to 10 parts by mass, more preferably from 3.5 to 8 parts by mass. In embodiments wherein the hydrophilic group is a non-ionic group, preferably, the amount of compound c. is in the range of from 5 to 25 parts by mass, more preferably from 10 to 20 parts by mass.

In embodiments, the ethylenically unsaturated compound d. comprises at least one (meth)acrylic group. An ethylenic unsaturation, such as in a (meth)acrylic group, may be introduced into compound d. via side groups, i.e., pendant groups, at terminal ends, and/or in the backbone, of compound d.

In embodiments, compound d. is selected from compounds containing at least one acrylic and/or methacrylic group. In embodiments, compound d. comprises two or more nucleophilic groups capable of reacting with an isocyanate (typically a hydroxyl group). Examples of such compound d. are polyester (meth)acrylates containing hydroxyl groups, polyether (meth)acrylates containing hydroxyl groups, polyether ester (meth)acrylates containing hydroxyl groups, and/or polyepoxy (meth)acrylates containing hydroxyl groups. In embodiments, compound d. is an acrylate. In embodiments, compound d. comprises at least one linear compound comprising on average 2 hydroxyl groups per molecule. Such compounds are well known in the art. Preferable, compound d. comprises polyester (meth)acrylates and/or polyepoxy (meth)acrylates with 2 or more, typically on average 2 hydroxyl groups. Preferably, compound d. comprises an aliphatic compound.

Preferably, compound d. comprises one or more ethylenically unsaturated functions (such as acrylic and/or methacrylic groups) and one nucleophilic function capable of reacting with an isocyanate (typically a hydroxyl group). More preferably, compound d. comprises a (meth)acryloyl mono-hydroxy compound, such as a poly(meth)acryloyl mono-hydroxy compound. Preferably, compound d. comprises an acrylate. In embodiments, compound d. comprises a mixture of at least two of the above compounds.

In alternative embodiments, compound d. comprises an esterification product of aliphatic and/or aromatic polyols, preferably an aliphatic polyol, with (meth)acrylic acid, having a residual average hydroxyl functionality of 0.9 to 1.1, preferably 0.95 to 1.05. In preferred embodiments, compound d. comprises a partial esterification product of (meth) acrylic acid with tri-, tetra-, penta- or hexahydric polyols, or a mixture thereof. In embodiments, compound d. comprises a reaction product of a polyol with ethylene oxide and/or propylene oxide, or mixtures thereof. In embodiments, compound d. comprises a reaction product of a polyol with a lactone, which may react with said polyol in a ring-opening reaction. In embodiments, the lactone comprises at least one of γ-butyrolactone, δ-valerolactone and ε-caprolactone, preferably δ-valerolactone and ε-caprolactone. Preferably, the alkoxylated polyol has at most three alkoxy groups per hydroxyl functionality, and comprises ε-caprolactone. Preferably, the polyol is partly esterified with acrylic acid, methacrylic acid, or mixtures thereof, until a preferred residual hydroxyl functionality is reached.

Preferably, compound d. comprises at least two (meth) acryl functions, such as glycerol diacrylate, trimethylolpropane diacrylate, glycerol diacrylate, pentaerythritol triacrylate, ditrimethylolpropane triacrylate, dipentaerythritol pentaacrylate, and their (poly)ethoxylated and/or (poly) propoxylated equivalents (of any of these).

In embodiments, compound d. is obtained from the reaction of a (meth)acrylic acid with an aliphatic compound, cycloaliphatic compound, or aromatic compound, having an epoxy functionality and at least one (meth)acrylic functionality. In embodiments, compound d. is obtained from the reaction of an aliphatic, cycloaliphatic, or aromatic acid with an epoxy group containing (meth)acrylate, such as glycidyl (meth)acrylate.

Other suitable compounds that may be used for compound d. are (meth)acrylic esters with linear and branched polyols in which at least one hydroxy functionality remains free to react with an isocyanate group, such as hydroxyalkyl(meth) acrylates comprising an alkyl group of from 1 to 20 carbon atoms. For example, compound d. may comprise at least one of hydroxyethyl (meth)acrylate, hydroxypropyl (meth)acrylate, and hydroxybutyl (meth)acrylate.

In embodiments, compound d. may comprise at least one of, e.g. a mixture of, the compounds described with respect to compound d.

In embodiments, an adduct comprises both the functionalities of compound a. and d., i.e., comprises both compound a. and d. Said adduct may be formed by the reaction of an excess of one or more compounds a., with one or more compounds d. In another embodiment of the invention, compounds a. and d. are provided as separate molecules.

In embodiments, an amount of compound d. used for the synthesis of the radiation-curable polyurethane in the range of from 15 to 85 parts by mass, preferably from 15 to 70 parts by mass, more preferably from 22 to 70 parts by mass, and most preferably from 30 to 60 parts by mass, wherein the parts by mass of compounds a., b., c., and d. sum up to 100. If compounds a and d are comprised in an adduct, the amount of adduct used for the synthesis of the radiation-curable polyurethane may be in a range having as lower limit the sums of the lower limits of a and d, and as a higher limit, the sums of the higher limits of a and d.

In embodiments of the first aspect, the compounds that are reacted to obtain the radiation-curable polyurethane dispersion compound additionally comprise a compound e. that is a diol having a molecular weight of at most 400 g/mol. In embodiments, the parts by mass of compounds a., b., c., and d. sum up to 100, and compound e. is added in an amount of from 0 to 5 parts by mass, such as 1 to 5 parts by mass.

In embodiments, compound e. comprises at least one of the following compounds: ethylene glycol, propylene glycol, 1,3-propanediol, 1,3-butanediol, 1,4-butanediol, 1,5-pentanediol, 1,6-hexanediol, 1,7-heptanediol, 1,8-octanediol, neopentyl glycol, diethylene glycol, dipropylene glycol, triethylene glycol, tetraethylene glycol, dibutylene glycol, 2-methyl-1,3-pentanediol, 2-ethyl-2-butyl-1,3-propanediol, 2-ethyl-1,6-hexanediol, 2,2,4-trimethyl-1,3-pentanediol, 1,4-cyclohexanedimethanol, ethylene oxide adducts or propylene oxide adducts of bisphenol A or hydrogenated bisphenol A, or mixtures thereof. In embodiments, compound e. comprises at least one of the following compounds: glycerol, trimethylolethane, trimethylolpropane, di-trimethylolethane, di-trimethylolpropane, and pentaerythritol, and/or di-pentaerythritol.

In embodiments of the first aspect, the compounds that are reacted to obtain the radiation-curable polyurethane dispersion additionally comprise a compound f. comprising at least two amino groups independently selected from primary and secondary amino groups. In embodiments, the compound f. has a molecular weight of at most 200 g/mol. The compound f may function as a chain extender.

Chain extending polyamines typically have an average functionality from 2 to 4, more preferably 2 to 3. Compound f. is preferably a water-soluble aliphatic, alicyclic, aromatic, or heterocyclic primary and/or secondary polyamine or hydrazine having up to 60, preferably up to 12 carbon atoms.

The amount of compound f. added in the reaction to form the radiation-curable polyurethane may be determined from the amount of residual, i.e., unreacted, isocyanate groups present in radiation-curable polyurethane prepolymer. Herein, the radiation-curable polyurethane prepolymer is the compound obtained by reaction compounds a., b., c., and d. and possibly e., and before reaction with compound f. In embodiments, compound f. is added after reacting compounds a., b., c., and d. and possibly e. In embodiments, a ratio, by number of functional groups, of the amine groups in compound f. to isocyanate groups in the prepolymer obtained after reaction of compounds a., b., d., and d., and optionally e., ranges from 0.25 to 1.2, preferably from 0.5 to 0.95. The residual isocyanate content is typically measured by isocyanate titration with an amine. The amount of amine groups is typically obtained by calculation. In embodiments wherein compound f. is reacted to obtain the radiation-curable polyurethane, compound f. may be added in an amount in the range of from 0.1 to 10 parts by mass, preferably from 0.1 to 5 parts by mass wherein the sum of the parts by mass of all compounds reacted to obtain the radiation-curable polyurethane is 100. In embodiments, the parts by mass of compounds a., b., c., and d. sum up to 100, and compound f. is added in an amount from 1 to 15 parts by mass, preferably from 1 to 10 parts by mass, and more preferably from 1 to 5 parts by mass.

In embodiments, the chain extending amine, i.e., compound f., comprises at least one of the following compounds: hydrazine, ethylene diamine, piperazine, 1,4-butanediamine, 1,6-hexanediamine, 1,8-octanediamine, 1,10-decanediamine, 1,12-dodecane-diamine, 2-methylpentamethylenediamine, triethylene triamine, isophorone diamine (or 1-amino-3¬aminomethyl-3,5,5-trimethyl-cyclohexane), aminoethylethanolamine, polyethylene amines, polyoxyethylene amines and polyoxypropylene amines (e.g. Jeffamines from Huntsman), as well as mixtures thereof.

In embodiments, the composition comprises a further ethylenically unsaturated compound. The further ethylenically unsaturated compound may be added to the composition before, during, or after dispersion of the water-dispersible radiation-curable polyurethane. Typically, the further ethylenically unsaturated compound is not reacted to become part of the radiation-curable polyurethane dispersion. For example, the further ethylenically unsaturated compound is only added to the composition after the formation of the radiation-curable polyurethane dispersion. In embodiments comprising the water-dispersible non-radiation-curable further polyurethane, the further ethylenically unsaturated compound is not reacted to become part of the water-dispersible radiation-curable further polyurethane. In other words, typically, the unreacted further ethylenically unsaturated compound is part of the composition. In embodiments, the further ethylenically unsaturated compound comprises no functional groups which are capable of reacting with isocyanate groups. In these embodiments, the further ethylenically unsaturated compound may be added before or during a step or reacting compounds a., b., c., and d. A better dispersion stability is generally obtained when the further ethylenically unsaturated compound is added before dispersion of the radiation-curable polyurethane dispersion in water. In embodiments, the further ethylenically unsaturated compounds is different from compound d. In embodiments, the further ethylenically unsaturated compound also is a (meth)acrylated compound.

In embodiments, the further ethylenically unsaturated compound is independently selected from (meth)acrylated compounds described above with respect to compound d. In embodiments, the further ethylenically unsaturated compound may be any compound that is ethylenically unsaturated, and comprising no functionality which is capable of reacting with an isocyanate group.

In embodiments, the further ethylenically unsaturated compound comprises an aliphatic and aromatic polyhydric polyol, which preferably has been esterified with (meth) acrylic acid. Thereby, preferably, the further ethylenically unsaturated compound contains no residual hydroxyl functionality. Preferably, the further ethylenically unsaturated compound is an esterification product of (meth)acrylic acid with a tri-, tetra-, penta- and/or hexahydric polyol or mixtures thereof. In embodiments, the further ethylenically unsaturated compound is a reaction product of a tri-, tetra-, penta- and/or hexahydric polyol with ethylene oxide and/or propylene oxide or mixtures thereof. In embodiments, the further ethylenically unsaturated compound is a reaction product of a tri-, tetra-, penta- and/or hexahydric polyol with a lactone. The ethylene oxide, propylene oxide, and the lactone may react with the polyol in a ring-opening reaction. In embodiments, the lactone is γ-butyrolactone, δ-valerolactone or ε-caprolactone, preferably δ-valerolactone or ε-caprolactone. In preferred embodiments, the polyol is an alkoxylated polyol having no more than two alkoxy groups per hydroxyl functionality, or a polyol modified with ε-caprolactone. Preferably, the, modified or unmodified, polyol is esterified with acrylic acid, methacrylic acid or mixtures thereof, preferably until no residual hydroxyl functionality remains. In embodiments, the further ethylenically unsaturated compound comprises one of trimethylolpropane tri-acrylate, glycerol tri-acrylate, pentaerythritol tetra-acrylate, di-trimethylolpropane tetra-acrylate, di-pentaerythritol hexa-acrylate and their (poly)ethoxylated and (poly) propoxylated equivalents, or mixtures thereof.

In embodiments, the further ethylenically unsaturated compound comprises one of the following compounds: an urethane (meth)acrylate, an epoxy (meth)acrylate, a polyester (meth)acrylate or a (meth)acrylic (meth)acrylate; or a mixture thereof. In a preferred embodiment, the further ethylenically unsaturated compound is a polyurethane (meth)acrylate dispersion.

In embodiments, the further ethylenically unsaturated compounds is a waterborne compound. The further ethylenically unsaturated compound may be water-dispersible or water-dilutable. Examples of urethane(meth)acrylates dispersion are UCECOAT® 7788, UCECOAT® 7655, UCECOAT® 7700, UCECOAT® 7230, UCECOAT® 7240, and UCECOAT® 7177. Examples of suitable water-dilutable urethane(meth)acrylates are for instance UCECOAT® 6569, EBECRYL® 2002 and EBECRYL® 11. Such (meth)acrylate compounds are well-known in the art. Methods for making such (meth)acrylate compounds also known in the art, and have previously been described in various patent applications. In embodiments, the radiation-curable polyurethane dispersion and, when present, the non-radiation-curable further polyurethane dispersion are present in an amount of 100 parts by mass, and the further ethylenically unsaturated compound is present in an amount of from 0 to 20 parts by mass, such as from 1 to 20 parts by mass.

In embodiments, the further ethylenically unsaturated compound may comprise at least one of, e.g. a mixture of, the compounds described with respect to the further ethylenically unsaturated compound.

In embodiments of the first aspect, the polyurethane particles are not-radiation curable. The polyurethane particles have a median diameter D50 of from 5 to 8 μm. Herein, D50 is the diameter in microns that splits a diameter distribution with half of the particles above and half of the particles below this diameter. The polyurethane particles of this invention may alternatively be described as polyurethane beads, as polyurethane filler, or as polyurethane microparticles or microspheres. It is an advantage of embodiments of the present invention that the polyurethane particles may provide a soft feeling to a coating formed with the composition.

In embodiments of the first aspect, the $T_g$, i.e., the glass transition temperature, of the polyurethane particles is at most 0° C., preferably at most −40° C., more preferably at most −50° C. It is an advantage of embodiments of the present invention that, as the polyurethane particles may be in a glass state at room temperature, they may provide softness to a coating comprising the polyurethane particles. In embodiments, the polyurethane particles are insoluble, preferably at least in water. The polyurethane particles are chemically crosslinked polyurethane based molecules. This differentiates the particles from aggregates or micelles that are formed by physical interactions such as hydrophobic/hydrophilic interactions of molecules. In embodiments, an oil absorption of the polyurethane particles is at most 120%, that is, of 120 gram oil per 100 gram polyurethane particles. Herein, the oil absorption is preferably determined using an ISO or ASTM technique, such as using ASTM D 281.

In embodiments, the polyurethane particles have a first volume before compression, and, after compression using a force of 63 mN, for example for 1 minute, and subsequent relaxation, a second volume that is at least 90% of the first volume, as determined using a Micro Compression Tester—Testing Machines|Shimadzu MCT Series. It is an advantage of embodiments of the present invention that the polyurethane particles are soft and elastic. The softness and elasticity may provide a soft feeling to a coating comprising the polyurethane particles. The polyurethane particles are solid, i.e., not liquid or gaseous.

The polyurethane particles are typically transparent, although the invention is not limited thereto. In particular embodiments, the polyurethane particles may comprise a dye or a pigment.

In embodiments, the polyurethane particles consist of at least 60%, preferably for at least 80%, more preferably at least 90%, most preferably at least 95% polyurethane. Typically, the polyurethane particles are essentially consisting of polyurethane. In embodiments, the polyurethane of the polyurethane particles is an aliphatic polyurethane. In embodiments, the polyurethane particles are formed with a polyol, wherein the polyol preferably comprises at least one of a polyester polyol, a polycarbonate polyol, or a polyether polyol. In preferred embodiments, the polyurethane particles may be obtained from renewable vegetable sources. In preferred embodiments, the polyurethane particles are obtained using a water-based process. In preferred embodiments, the polyurethane particles are obtained using a process that is free of solvents different from water, preferably free of organic solvents. It is an advantage of embodiments of the present invention that the polyurethane particles may be free of volatile organic compounds (VOCs), alkylphenol ethoxylates (APEOs), phthalates, formaldehyde, and heavy metals. In embodiments, the polyurethane particles are free of isocyanate groups. Suitable polyurethane particles to be used in embodiments of the present invention, are, for example, Decosphaera Transparent® HT 8-20, MicroTouch® 850XF, and Addimat® 8FT. In embodiments of the first aspect, the composition comprises a non-radiation-curable further polyurethane dispersion obtained by reacting: i. a compound comprising at least two isocyanate groups, ii. a polyol having a molecular weight of at least 500 g/mol, iii. a compound comprising at least one group capable of reacting with an isocyanate group, and at least one hydrophilic group, preferably comprising a salt, or capable of comprising a salt after reaction with a neutralizing agent, and iv. a compound comprising at least two amino groups selected from primary and secondary amino groups. In embodiments, the compound iv. has a molecular weight of at most 200 g/mol, such as at most 150 g/mol.

In embodiments, the non-radiation-curable further polyurethane dispersion is prepared by: reacting compound i. and ii. and preferably compound iii., thereby forming a prepolymer; dispersing the prepolymer in an aqueous solvent; and chain extending the prepolymer by reacting the prepolymer with compound iv.

In embodiments, compound i. may be independently selected from any of the compounds as described for compound a.

Any polyol known to those skilled in the art can be used as polyol ii. In embodiments, compound ii. may be independently selected from any of the compounds as described for compound b. Typical polyols include, but are not limited to, glycols, and polymeric polyols. In embodiments, the glycol comprises alkylene glycols, such as ethylene glycol; 1,2- and 1,3-propylene glycols; 1,2-, 1,3-, 1,4-, and 2,3-butylene glycols; hexane diols; neopentyl glycol; 1,6-hexanediol; 1,8-octanediol; and other glycols such as bisphenol-A, cyclohexane diol, cyclohexane dimethanol (1,4-bis-hydroxymethylcycohexane), 2-methyl-1,3-propanediol, 2,2,4-trimethyl-1,3-pentanediol, triethylene glycol, tetraethylene glycol, polyethylene glycol, dipropylene glycol, polypropylene glycol, dibutylene glycol, polybutylene glycol, caprolactone diol, dimerate diol, hydroxylated bisphenols, polyether glycols, halogenated diols, and mixtures thereof. However, the invention is not limited thereto.

In embodiments, the polymeric polyol used for compound ii. may be selected from polyester polyols, polyether polyols, polyhydroxy polyester amides, hydroxyl-containing polycaprolactones, hydroxyl-containing acrylic interpolymers, hydroxyl-containing epoxides, polyalkylene ether polyols, polyhydroxy polycarbonates, polyhydroxy polyacetals, polyhydroxy polythioethers, polysiloxane polyols, ethoxylated polysiloxane polyols, polybutadiene polyols, and mixtures thereof. Representative polyols useful in the methods of the present invention, include those described in U.S. Pat. Nos. 4,108,814 and 6,576,702, the contents of which are incorporated herein by reference.

In preferred embodiments, polyol ii. comprises a polymeric polyol. Preferred polymeric polyols include polyester polyols, polyethers polyol, and hydroxy polycarbonates.

Polyester polyols are esterification products prepared by reacting an organic polycarboxylic acids or their anhydrides with a stoichiometric excess of a diol. In embodiments, the polyester polyol used for polyol ii. may comprise at least one of polyglycol adipate, isophthalate, orthophthalate, terephthalate, polycaprolactone polyol, sulfonated polyol, and mixtures thereof. In embodiments, the polyester polyol may be formed from a diol described with respect to polyol b. Preferred diols for forming the polyester polyol are ethylene glycol, butylene glycol, hexane diol, and neopentyl glycol. Suitable carboxylic acids for making the polyester polyols include, but are not limited to, dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids, and mixtures thereof. Preferred polycarboxylic acids for forming the polyester polyol include aliphatic or aromatic dibasic acids.

The hydroxy polyether may be selected from any hydroxy polyether known in the art. In embodiments, the hydroxy polyether is obtained by the polymerization of an epoxide, such as ethylene oxide, propylene oxide, butylene oxide, tetrahydrofuran, styrene oxide, or epichlorohydrin, or mixtures thereof. The epoxide may be polymerized in the presence of a catalyst such as $BF_3$, or in the absence of a catalyst. The hydroxy polyethers may be formed by addition of the epoxide, optionally as a mixture of epoxides, to components that contain reactive hydrogen atoms, such as alcohols or amines (e.g, water, ethylene glycol, propylene-1,3- or 1,2-glycol, 4,4'-dihydroxy-diphenylpropane or aniline).

In embodiments, the hydroxy polythioether is formed by condensing thiodiglycol, either by self-condensation and/or by condensation with another glycol, dicarboxylic acid, formaldehyde, aminocarboxylic acid, or aminoalcohol. Thereby, the hydroxy polythioether may comprise a polythio mixed ether, a polythio ether ester, or a polythioether ester amide. The hydroxy polythioether is however not limited to these embodiments.

In embodiments, the hydroxy polyacetal comprises the reaction product of glycols, such as diethyleneglycol, triethyleneglycol, 4,4'-dioxethoxy-diphenyldimethylmethane, and hexane diol with formaldehyde. In embodiments, the hydroxy polyacetal is obtained by polymerizing cyclic acetals. The hydroxy polyacetal is however not limited to these embodiments.

The hydroxy polycarbonate may be any hydroxy polycarbonate known to the skilled person. In embodiments, the hydroxy polycarbonate is formed by reacting a diol, such as propane-1,3-diol, butane-1,4-diol, hexane-1,6-diol, diethylene glycol, triethyleneglycol, or tetraethyleneglycol, with a diarylcarbonate, such as diphenylcarbonate or phosgene.

In embodiments, the hydroxy polyester amide and the hydroxy polyamide comprise a predominantly linear, e.g., linear, condensate obtained from the reaction of a saturated or unsaturated polycarboxylic acid or their anyhydride, and a polyvalent saturated or unsaturated aminoalcohol, diamine, polyamine, or mixture thereof. Preferred aminoalcohols, diamines, and polyamines used for forming the polyester amide and polyamide include, but are not limited to, 1,2-diaminoethane, 1,6-diaminohexane, 2-methyl-1,5-pentanediamine, 2,2,4-trimethyl-1,6-hexanediamine, 1,12-diaminododecane, 2-aminoethanol, 2-[(2-aminoethyl) amino]-ethanol, piperazine, 2,5-dimethylpiperazine, 1-amino-3-aminomethyl-3,5,5-trimethylcyclohexane (isophorone diamine or IPDA), bis-(4-aminocyclohexyl)-methane, bis-(4-amino-3-methyl-cyclohexyl)-methane, 1,4 diaminocyclohexane, 1,2-propylenediamine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl) amine, N-(2-piperazinoethyl)-ethylene diamine, N,N'-bis-(2-aminoethyl)-piperazine, N,N,N'tris-(2-aminoethyl] ethylene diamine, N—[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)amine, N, N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)ethylene diamine, and 2,4-bis-(4'-amino-benzyl)-aniline, and mixtures thereof. Other suitable diamines and polyamines include Jeffamine® D-2000 and D-4000, which are amine-terminated polypropylene glycols, differing only by molecular weight (commercially available from Huntsman Chemical Company). Polyhydroxyl compound comprising an urethane or urea group may be used. In a particular embodiment, the hydroxy polyamide is a linear polyamide formed by reacting adipic acid and 1,6-diamino-hexane. In a particular embodiment, the polyester amide is formed by reacting an adipic acid, 1,6-hexanediol, and ethylene diamine.

However, the polyol ii. is not limited to any of the embodiments described above. For example, the polyol ii. may be selected from any polyol described in High Polymers, Vol. XVI, "Polyurethanes, Chemistry and Technology" by Saunders-Frisch, Interscience Publishers, New York, London, Volume I, 1962, pages 32-42 and pages 44-54 and Volume II, 1964, pages 5-6 and 198-199, and in Kunststoff-Handbuch, Volume VII, Vieweg-Hochtlen, Carl-Hanser-Verlag, Munich, 1966, e.g. on pages 45 to 71.

In embodiments, the polyol ii. comprises two or more of the compounds described with respect to the polyol ii. That is, the polyol compound ii. may be a mixture. In preferred embodiments of the first aspect, the polyol compound ii. is a polyester or a polyether.

In embodiments, compound iii. may be independently selected from any of the compounds as described for compound c.

In embodiments, compound iv. may be independently selected from any of the compounds as described for compound f.

In embodiments of the first aspect, the non-radiation-curable further polyurethane dispersion represents from 0.1 to 40 wt % of the sum of masses of non-radiation-curable further polyurethane dispersion, radiation-curable polyurethane dispersion, and polyurethane particles. In embodiments, the non-radiation-curable further polyurethane dispersion is provided as an aqueous dispersion. Preferably, the aqueous dispersion comprises from 30 to 45 wt % of the water-dispersible non-radiation-curable further polyurethane. Preferably, the aqueous dispersion has a dynamic viscosity below 1000 mPa·s, preferably below 500 mPa·s, more preferably below 200 mPa·s. Preferably, a pH of the aqueous dispersion is from 7 to 10. Preferably, the non-radiation-curable further polyurethane dispersion has a Tg of from 0 to 100° C., such as from 10 to 60° C. Preferably, the Mw of the water-dispersible non-radiation-curable further polyurethane is at least 100,000 g/mol, such as at least 1,000,000 g/mol. Examples of commercial aqueous dispersions that may comprise a suitable non-radiation-curable further polyurethane dispersion are Daotan® 6490, Daotan® 6491, and Daotan® 6493.

In embodiments of the first aspect, the compounds that are reacted to obtain the non-radiation-curable further polyurethane dispersion additionally comprises a compound v. that is a diol having a molecular weight of less than 500 g/mol, preferably at most 150 g/mol. The diol v. may be independently selected from any of the compounds as described for compound b. with the proviso that it has a Mw inferior or equal to 500 g/mol. In embodiments of the first aspect, a mass ratio of the radiation-curable polyurethane dispersion to the non-radiation-curable further polyurethane dispersion in the composition is at least 1.5.

In embodiments of the first aspect, the plurality of polyurethane particles, as solid content, represents from 3 to 20 wt % of the composition. In the following embodiments, the amount of polyurethane particles, as solid content, may be independent of the amount of water in the composition, and may only depend on the concentration of polyurethane present in the composition. In embodiments not comprising the further non-radiation-curable polyurethane dispersion, a mass ratio of the plurality of polyurethane particles, to the radiation-curable polyurethane dispersion may be from 0.08 to 1.0. In embodiments comprising the radiation-curable further polyurethane dispersion, a mass ratio of the plurality of polyurethane particles, to the total of the radiation-curable polyurethane dispersion and the radiation-curable further polyurethane dispersion compound, may be from 0.08 to 1.0.

In preferred embodiments, the composition comprises from 7 to 25 wt % radiation-curable polyurethane dispersion, from 0 to 15 wt % non-radiation-curable further polyurethane dispersion, from 3 to 20 wt % polyurethane particles, from 0.1 to 5 wt % photoinitiator, from 0 to 5 wt %, such as from 0.1 to 5 wt %, additives different from the photoinitiator, and from 30 to 80 wt % water.

The radiation-curable polyurethane dispersion and the non-radiation-curable polyurethane dispersion may be provided as a dispersion in water. That is, the radiation-curable polyurethane dispersion may be provided as a radiation-curable polyurethane dispersion. The water-dispersible non-radiation-curable polyurethane may be provided as a non-radiation-curable polyurethane dispersion. Preferably, a dispersion comprises from 30 to 50 wt % of the polyurethane and for the rest water. In these embodiments, preferably, the composition comprises from 30 to 85 wt % radiation-curable polyurethane dispersion, from 0 to 40 wt % of the dispersible further polyurethane compound, from 3 to 20 wt % polyurethane particles, from 0.1 to 5 wt % photoinitiator, from 0.1 to 5 wt % additives different from the photoinitiator, from 0 to 20 wt % additional water, in addition to water comprised in the dispersions.

In embodiments, the composition of the first aspect may further comprise at least one additive selected from rheology modifiers, thickeners, coalescing agents, antifoam agents, wetting agents, adhesion promoters, flow and leveling agents, biocides, surfactants, stabilizers, anti-oxidants, wax, further fillers different from the polyurethane particles, nanoparticles different from the polyurethane particles and the radiation-curable polyurethane and the non-radiation-curable polyurethane, matting agents, inert or functional resins, pigments, dyes, and tints. In preferred embodiments of the first aspect, the composition further comprises at least one of the following additives: a catalyst, a polymerization inhibitor, or a photo-initiator.

In embodiments, the at least one additive is suitable to improve the application of the formulated dispersion on a substrate, such as rheology modifiers, anti-settling agents, wetting agents, leveling agents, anti-cratering agents, defoaming agents, slip agents, fire retardant agents, ultraviolet-protection agents, or adhesion promoters. Examples of suitable inhibitors include but are not limited to hydroquinone (HQ), methyl hydroquinone (THQ), tert-butyl hydroquinone (TBHQ), di-tert-butyl hydroquinone (DTBHQ), hydroquinone monomethyl ether (MEHQ), 2,6-di-tert-butyl-4-methylphenol (BHT), and the like. The inhibitor may comprise a phosphine such as triphenylphosphine (TPP) and tris-nonylphenylphosphite (TNPP), phenothiazine (PTZ), triphenyl antimony (TPS), and mixtures thereof.

The aqueous radiation-curable composition according to embodiments of the present invention may be curable by irradiation, such as by ultraviolet light. Preferably, the irradiation occurs in the presence of a photoinitiator. The aqueous radiation-curable composition may alternatively be cured by electron-beam irradiation, which may result in good curing in absence of a photoinitiator. The composition according to embodiments of the present invention may be curable at a high rate. The composition may, for example, be cured by UV LED and/or HUV.

In embodiments, the photoinitiator comprises a low- to non-yellowing photoinitiator, such as Omnirad® 1000, Omnirad® 481 from IGM, DOUBLECURE® 200 from Comindex, Chemcure® 73, Chemcure® 73-w, Chemcure® 481 from Chembridge, Irgacure® 184, and Darocure® 1173 from IGM. If an end use of the aqueous radiation-curable composition requires low migration and/or is in food packaging, then it may be preferred to use polymeric photoinitiators such as Omnipol® grades from IGM, Irgacure® 2959 from IGM, or food-proof thioxanthone photoinitiators. If different end uses of the aqueous radiation-curable composition are considered, such as inks, it may be preferred to use the photoinitiator together with an amine synergist such as EBECRYL® P115, EBECRYL® P116, or DOUBLECURE® 225. When UV LED curing is used for curing of the composition, it is preferred to use EBECRYL® LED 01 or EBECRYL® LED 02.

The radiation-curable polyurethane dispersion according to embodiments of the first aspect may comprise an amount of copolymerizable ethylenically unsaturated groups of at least 1 meq/g, typically at least 1.5 meq/g, preferably at least 2 meq/g. Herein, meq means milli-equivalent, and g means gram. Typically this amount does not exceed 10 meq/g, more preferably it does not exceed 7 meq/g, and most preferably it does not exceed 5 meq/g. That is, the radiation-curable polyurethane dispersion may have a degree of unsaturation that is in the range of from 1 to 10 meq double bonds/g of radiation-curable polyurethane dispersion, preferably from 1.5 to 7 meq double bonds/g of radiation-curable polyurethane dispersion, and most preferably from to 2 to 5 meq double bonds/g of radiation-curable polyurethane dispersion.

The amount of ethylenically unsaturated groups in the radiation-curable polyurethane dispersion may be determined by nuclear magnetic resonance spectroscopy (NMR). The amount of ethylenically unsaturated groups may be expressed in meq per g of solid material. For the determination, a sample of dry, i.e., water- and solvent-free, radiation-curable polyurethane may be dissolved in N-methylpyrolidinone. The sample is measured using $^{1}$H-NMR analysis in order to determine the molar concentration of ethylenically unsaturated groups, wherein, for example, 1,3,5-bromobenzene may be used as internal standard. The comparison between the peak assigned to protons bonded to the aromatic ring of the internal standard, and the peaks assigned to protons of an ethylenically unsaturated group in the radiation-curable polyurethane dispersion may allow calculating the molar concentration of ethylenically unsaturated groups. The molar concentration of ethylenically unsaturated groups may be assumed to be proportional to (A×B)/C. Herein, A is the integration of the 1H peaks assigned to protons of ethylenically unsaturated groups in the radiation-curable polyurethane dispersion. Herein, B is the number of moles of the internal standard in the sample. Herein, C is the integration of $^{1}$H peaks measured for the internal standard.

Alternatively, the amount of ethylenically unsaturated may be measured by a titration method following the addition of an excess of pyridinium sulfate dibromide on the ethylenically unsaturated groups. Herein, for example, glacial acetic acid may be used as the solvent, and mercury acetate may be used as a catalyst. Said excess liberates iodine in the presence of potassium iodide and the iodine is then titrated with sodium thiosulfate.

Typically, the radiation-curable polyurethane dispersion according to embodiments of the present invention comprises a polymeric or oligomeric compound. In embodiments, the radiation-curable polyurethane dispersion according to the invention has a weight average molecular weight (Mw) of from 500 to 20,000 Dalton, i.e., g/mol, preferably from 800 to 10,000 Dalton and most preferably from 1,000 to 5,000 Dalton. The weight average molecular weight (Mw) is typically measured by gel permeation chromatography. For example, the gel permeation chromatography may be performed using THE as eluent, using a 3xPLgel 5 μm Mixed-D LS 300×7.5 mm column, suitable for an Mw range of from 162 to 377400 g/mol, and calibrated with polystyrenes standards, at 40° C.

In embodiments, the aqueous radiation-curable composition according to embodiments of the present invention has a total solid content of from 30 to 65 wt %, preferably from 35 to 50 wt %. Herein, the total solid content comprises the radiation-curable polyurethane dispersion, the polyurethane particles, possibly the non-radiation-curable further polyurethane dispersion, and possibly, solid, additives. In embodiments, the non-solid, e.g., liquid, content of the aqueous radiation-curable composition comprises, preferably consists of, water. In embodiments, the aqueous radiation-curable composition has a viscosity measured at 25° C. of at most 1,000 mPa·s, preferably at most 800 mPa·s, more preferably at most 500 mPa·s, even more preferably at most 200 mPa·s. In embodiments, the aqueous radiation-curable composition has a pH of 6 to 11, preferably from 6 to 8.5.

The water-dispersible radiation-curable polyurethane, when dispersed in the water, typically forms nanoparticles. Typically, the average, i.e., mean, particle size of the radiation-curable polyurethane is at most 200 nm, preferably at most 150 nm. Typically, the average, i.e., mean, particle size of the non-radiation-curable polyurethane is from at most 200 nm, preferably at most 150 nm.

In embodiments, the radiation-curable polyurethane dispersion has a Tg of from 0 to 100° C., such as from 10 to 60° C.

Any features of any embodiment of the first aspect may be independently as correspondingly described for any embodiment of any of the other aspects of the present invention.

In a second aspect, the present invention relates to a coating formed by curing the composition according to embodiments of the first aspect. In embodiments, the coating has a thickness of 2 to 200 μm, in a direction perpendicular to a surface of the surface. Herein, the thickness is that of a dried coating typically obtained after removal of liquids including water.

Any features of any embodiment of the second aspect may be independently as correspondingly described for any embodiment of any of the other aspects of the present invention.

In a third aspect, the present invention relates to a method for forming the coating according to embodiments of the second aspect, comprising applying the composition according to embodiments of the first aspect to a surface, and curing the composition, thereby forming the coating. In embodiments, the composition may be applied to the surface in any possible way, such as via roller coating, spray application, inkjet, or curtain coating. In embodiments, the method comprises a further step of drying the coating, so as to remove the water and possibly other solvents comprised in the composition. In embodiments, the composition is applied to the surface so as to form a coating having a thickness of from 2 to 200 μm, in a direction perpendicular to a surface of the surface. Herein, the thickness is that of a dried coating.

In embodiments of the third aspect, the composition is applied to the surface at a temperature of from 40 to 60° C. Subsequently, the curing of the composition may be performed at a temperature of from 10 to 50° C., such as from 20 to 40° C.

Although a specific application of the radiation-curable aqueous composition for forming a coating is described, the invention is not limited thereto. Indeed, the radiation-curable aqueous composition according to the present invention may be used for forming coatings (clear and pigmented, glossy or matte), inks, paints, varnishes (like overprint varnishes), and adhesives. The radiation-curable aqueous composition may be further used for forming composites, gelcoats, 3D-curing, and the making of 3D-objects in general (such as 3-dimensional objects made from polyethylene, polypropylene, polycarbonate, polyvinylchloride, optionally pre-coated with other coatings such as polyurethanes).

The present invention therefore also relates to the use of the radiation-curable aqueous composition according to embodiments of the present invention for making inks, varnishes (like overprint varnishes), paints, coatings, and adhesives and to a process for making inks, varnishes (like overprint varnishes), coatings and adhesives wherein a composition as described here above is used.

In embodiments, the surface is comprised in a substrate or an article. In embodiments, a coated substrate or article is prepared by embodiments of the third aspect, wherein the step of applying the composition to the surface comprises coating at least part of the substrate or article with the radiation-curable aqueous composition, and preferably, curing the radiation-curable aqueous composition. That is, the method of the third aspect may be for coating, at least partially, an article or substrate with a coating according to embodiments of the second aspect, comprising:

(a) providing the radiation-curable aqueous composition,
(b) applying said composition onto a surface of the article or substrate, and
(c) curing the composition, preferably by irradiating the composition with radiation, such as with actinic radiation.

In an auxiliary aspect, the present invention relates to an article or substrate coated, at least partially, such as entirely, with a radiation curable aqueous composition according to the first aspect of the present invention or with a coating according to embodiments of the second aspect of the present invention. The substrate may be any substrate, such as wood, metal, paper, plastic, fabric, fiber, ceramic, mineral materials (stone, brick), cement, plaster, glass, leather or leather-like, concrete, and already printed or coated materials (e.g. melamine panels, printed paper . . . ), etc. The article may be any article, such as a 3D article. Preferably, the article or substrate is made from wood or plastic.

The composition may be applied as a single coat (monocoat), or as a topcoat.

The radiation-curable composition is typically a composition that is able to cure through a reaction involving radicals. Although curing is typically performed by application of radiation, curing may, for example, instead be performed by adding peroxides to the composition. The radiation-curable composition according to embodiments of the first aspect may be curable by exposure to radiation due to the presence of an ethylenically unsaturated function in the radiation-curable polyurethane. The ethylenically unsaturated function may be due to the ethylenically unsaturated compound used to form the radiation-curable composition. In preferred embodiments, curing the radiation-curable aqueous composition is done by irradiation with UV light, possibly UV LED light, or an electron beam (EB). Low energy curing (like UV LED curing) is also possible. That is, the radiation-curable aqueous composition, after application to the surface, may be irradiated with actinic radiation, typically by using UV light or by using an electro beam. Suitable radiation types for the curing of the radiation-curable composition according to the first aspect is UV light. Suitable UV light wavelengths are comprised between 200 and 400 nm.

Typical suitable UV light sources emit light at wavelengths between 200 and 800 nm and emit at least some radiation in the range 200 to 400 nm.

The source of the UV light can for instance be a UV light-emitting diode (UV-LED). UV-LED typically emits in a spectrum with the strongest wavelength in the range of from 365 to 395 nm.

Any features of any embodiment of the third aspect may be independently as correspondingly described for any embodiment of any of the other aspects of the present invention.

In a fourth aspect, the present invention relates to a use of the coating according to embodiments of the second aspect, for consumer electronics, appliances, automotive interiors and exteriors, packagings such as cosmetic packagings, furniture, in-mold decoration, industrial application, graphic applications, or in-mold labeling, preferably for automotive interiors and exteriors, appliances, consumer electronics, or cosmetic packaging.

A particularly preferred use of the coating according to embodiments of the present invention is for automotive interiors and exteriors, preferably automotive interiors.

Any features of any embodiment of the fourth aspect may be independently as correspondingly described for any embodiment of any of the other aspects of the present invention.

In a fifth aspect, the present invention relates to a method for forming an aqueous radiation-curable composition according to embodiments of the first aspect of the present invention comprising mixing a radiation-curable polyurethane dispersion compound obtained by reacting: a. a compound comprising at least two isocyanate groups, b. a polyol having a molecular weight of at least 500 g/mol, c. a compound comprising at least one group capable of reacting with an isocyanate group, and at least one hydrophilic group, preferably comprising a salt, or capable of comprising a salt after reaction with a neutralizing agent, and d. an ethylenically unsaturated compound comprising at least one group capable of reacting with an isocyanate group, and at least one ethylenically unsaturated group, and a plurality of polyurethane particles having a median diameter D50 of from 1 to 10 μm, and water.

Aqueous radiation-curable composition according to embodiments of the present invention can be prepared in many ways. The radiation-curable polyurethane dispersion is typically provided in the form of an aqueous solution or an aqueous dispersion. That is, the water and the radiation-curable polyurethane dispersion may be provided from a mixture comprising the water and the radiation-curable polyurethane dispersion.

In embodiments, forming the aqueous radiation-curable composition comprises a first step comprising the reaction of compounds a., b., c., and d, and possibly compound e. Herein, compounds a., b., c., and d. may be reacted together at the same time, or in a multi-stage process. For example, firstly, compounds a., c., and possibly b. may be reacted, and secondly, reacted with compounds d. Optionally, the process can further contain a step of chain extension by reaction with compound f. The step of reaction with compound f. is preferably performed after reacting a., b., c, and d., and possibly e., wherein compound f. reacts with any residual, i.e., unreacted, isocyanate groups. Thereby, a radiation-curable polyurethane dispersion according to embodiments of the present invention may be formed that, preferably, does not comprise unreacted isocyanate groups. Possibly, after termination of the reaction, further ethylenically unsaturated compounds may be added. The residual isocyanate content is typically measured by isocyanate titration with an amine. The amount of $NH_2$ groups is typically obtained by calculation. The reaction may be performed by the addition of 5 to 40 wt %, preferably 15 to 25 wt %, of a solvent in order to reduce the viscosity of the pre-polymer. Preferably, the solvent is acetone or methylethylketone.

Subsequently, in embodiments wherein the hydrophilic group provided by compound c. does not comprise a salt, but is capable of comprising a salt, the radiation-curable polyurethane dispersion may be reacted with a neutralizing agent in order to convert the hydrophilic groups into anionic salts. This may be done by adding an organic or inorganic neutralizing agent to the pre-polymer or the water. Suitable neutralizing agents include ammonia, volatile organic tertiary amines such as trimethylamine, triethylamine, triisopropylamine, tributylamine, N,N-dimethylcyclohexylamine, N,N-dimethylaniline, N-methylmorpholine, N-methylpiperazine, N-methylpyrrolidine and N-methylpiperidine, low volatile alcohol amines such as dimethylaminoethanol, triethanolamine, dimethylaminoethylpropanolamine, and non-volatile inorganic bases comprising monovalent metal cations, preferably alkali metals such as lithium, sodium and potassium and anions such as hydroxides, hydrides, carbonates, and bicarbonates. Preferably, the neutralizing agent comprises triethylamine and/or sodium hydroxide. The total amount of these neutralizing agents may be calculated according to the total amount of acid groups to be neutralized. In embodiments, the neutralizing agent is added in a stoichiometric ratio of neutralizing agent to acid groups, e.g., protonated hydrophilic groups, of from 0.5:1 to 1:1.

In embodiments, the radiation-curable polyurethane dispersion is dispersed in water, for example by adding a water-dispersible radiation-curable polyurethane slowly into water or reversely by adding water to the pre-polymer. Typically, the dispersing is performed using high-sheer mixing.

In embodiments, the neutralizing agent may be added before, during or after the step of dispersing the water-dispersible radiation-curable polyurethane in water.

Typically, after the formation of the dispersion of the pre-polymer, when said dispersion comprises a volatile, e.g., organic solvent with a boiling point of lower than 100° C., said solvent is removed from the dispersion. This may be done under reduced pressure, reduced with respect to atmospheric pressure, and at a temperature from 20 to 90° C., preferably from 40 to 70° C.

In embodiments, the polyurethane particles are provided in powder form. In embodiments, the polyurethane particles are provided as a dispersion or a suspension. For example, the polyurethane particles may be provided in water.

The composition according to embodiments of the present invention may be prepared in various ways. In embodiments, the radiation-curable polyurethane dispersion compound, the polyurethane particles, the water, and possibly additives and further compounds, are blended and mixed. In embodiments, high shear mixing is used for the mixing. In embodiments, the mixing may be performed using a Cowles blade, preferably at a rate of rotation of from 20 to 2000 rounds per minute. For example, the mixing may be performed at room temperature under high shear using for instance a Cowles blade at a rate of rotation of from 20 to 2000 rounds per minute. Herein, the rate of rotation may depend on a diameter of the Cowles blade, a vessel diameter, and a volume to be mixed.

In embodiments, the mixing may result in an aqueous radiation-curable composition wherein the polyurethane particles are in suspension. In embodiments, an antisetting agent may be added to the aqueous radiation-curable composition, to prevent sedimentation of the polyurethane particles.

Any features of any embodiment of the fifth aspect may be independently as correspondingly described for any embodiment of any of the other aspects of the present invention.

The present invention will now be described in detail with reference to the following non-limiting examples which are by way of illustration only. Except when otherwise indicated, the parts mentioned in the examples are parts by weight.

Example: Radiation-Curable Polyurethane Dispersion and Non-Radiation-Curable Polyurethane Dispersion First Radiation-Curable Polyurethane Dispersion (UV PUD 1)

The UV PUD 1 is the commercial product UCECOAT® 2804. It is a low migration acrylated polyurethane translucent dispersion obtained from the reaction of a compound a., a compound b., a compound c., a compound d., and a mixture of compounds e. It had a viscosity of 60 mPa·s, a solid content of 34.7 wt %, a particle size of 96 nm, and a pH of 7.2.

Second Radiation-Curable Polyurethane Dispersion (UV PUD 2)

The UV PUD 2 is a radiation-curable polyurethane dispersion obtained from the reaction of 262.1 g EBECRYL® 4744 (d.), 13.4 g of neopentyl glycol (e.), 118.8 g polyester of neopentyl glycol, adipic acid and isophthalic acid (Mw 635, b.), and 35.1 g dimethylolpropionic acid (c.) with 0.3 g of dibutyltin dilaurate, 133.9 g of isophorone diisocyanate (a.) and 66.9 g of hexamethylene diisocyanate (a.). The prepolymer obtained had a residual NCO of 0.5 meq NCO/g. Then 20.7 g of triethylamine was added. Finally, 11.8 g of ethylenediamine (f.) was added after the dispersion step. Final dispersion had a viscosity of 151 mPa·s, a solid content of 35.0 wt %, a particle size of 46 nm, and a pH of 7.9.

Example 1c: Non-Radiation-Curable Further Polyurethane Dispersion

Three dispersions comprising water-dispersible non-radiation-curable further polyurethane in water were used in the examples: Daotan® 6490 (PUD 1), Daotan® 6491 (PUD 2), and Daotan® 6493 (PUD 3). Each of these dispersions is commercially available. The properties of these dispersions are summarized in the below Table 0.

TABLE 0

Properties of PUD 1, 2, and 3, as used in the examples

| Property | Test method | Daotan ® 6490 | Daotan ® 6491 | Daotan ® 6493 |
|---|---|---|---|---|
| Type | | Polyester | Polyether | Polyester |
| Solids | Loss on Drying 3 Hrs. at 125° C. | 35% | 33% | 35% |
| pH @ 25° C. | | 9.0-9.5 | 10.0-10.5 | 9.5-10.0 |
| Glass Transition Tg (° C.) | DMA | 25 | 24 | 42 |

Preparation of Aqueous Radiation-Curable Composition, and Coatings Therefrom

For the examples, a range of compositions was prepared according to the following general recipe.

Aqueous radiation-curable polyurethane dispersion was poured out in a 250 ml plastic mixing vessel. Optionally, a non-radiation-curable further polyurethane dispersion was added to said aqueous radiation-curable polyurethane dispersion. The dispersion was agitated at 600 rpm using a Cowles mixer blade (⅝"). Next, water was added to the aqueous dispersions, followed by additives, obtaining a mixture. In the examples, Additol® VXW 390 and Additol® VXW 6580 were added as wetting agents, and Irgacure® 500 as a photoinitiator. Finally, fillers, e.g. polyurethane particles or non-polyurethane particles, were added to the mixture. The mixture was agitated at 600 rpm for about 20 minutes. All steps were performed at room temperature. The Cowles blade is preferred to ensure good dispersion of the polyurethane particles, thereby obtaining a composition according to an embodiment of the present invention.

The relative amount of the different compounds, additives, and fillers used in each composition is indicated in the examples below.

In the example below, the composition was used directly after preparation to form a coating. For this, each composition was applied to a surface of a plastic substrate (ABS: Magnum® 3616, ABS/PC: Bayblend® T85XF or T65XF). A bar coater was used to target a dry film thickness (DFT) of approximately 20 g/m$^2$. The applied composition was dried for 5 minutes at 60° C. Subsequently, curing using UV radiation was performed using two 120 W/cm Hg lamps (1000-1200 mJ/cm$^2$). The lamps passed once over the composition at a rate of 15 m/min (i.e., approximately 50 ft/min).

Analytical Techniques

Different analytical techniques were used to characterize compositions and coatings of the examples, and these techniques are described below.

Dynamic light scattering (DLS) measurements were used to characterize the hydrodynamic size of particles in the different compositions. Prior to the DLS measurements, the concentrated compositions were diluted using deionized distilled water. Thereby, a particle concentration of 0.05 w/w % was obtained. The diluted composition was filtered. Subsequently, DLS measurements were performed at 23° C. using a DelsaNano-c particle analyzer of Beckman-Coulter. Incident monochromatic light used in the DLS measurement has a wavelength of $\lambda$=658 nm. Scattered light was detected in near-backscattering geometry at an angle of 165°. The z-average particle size along with the polydispersity index was determined from a second-order cumulant analysis of the electric-field auto-correlation function. The single-particle diffusion coefficient was then estimated from the average decay constant. Therefrom, using Stokes' relationship, a median particle diameter D50 could be derived.

The solid content was determined by a gravimetric method. For the radiation-curable polyurethane dispersions, the gravimetric method comprises drying for 2 hours at 120° C. For the non-radiation-curable further polyurethane dispersions, the gravimetric method comprises drying for 3 h at 125° C.

The pH was measured according to DIN EN ISO 10390.

The viscosity of the radiation-curable polyurethane dispersions and of the non-radiation-curable further polyurethane dispersions is measured with a cone and plate type rheometer MCR092 (Paar-Physica) according to DIN EN ISO 3219. A fixed shear rate of 25 s$^{-1}$ was used, at 23° C.

The coatings were tested for adhesion, soft feel, and DEET resistance.

For the soft feel test, the coatings of the Examples were compared to commercially available WB 2k soft feel coatings from General Motors. The coatings of the Examples were rated by three different observers with respect to their softness. In the tables, a scale of from 1 to 4 is used to rate each coating, wherein 1 indicates good soft feel, and 4 indicates poor soft feel. Preferably, the coating scores 1 or 2.

Resistance, i.e., chemical resistance, of each coating of the Examples to DEET and sunscreen was also determined in accordance with General Motors sunscreen and insect repellant resistance test procedures, such as GMW14445. The GMW14445 test was performed at 80° C. Other tests were performed at room temperature and ambient humidity. A scale of from 1 to 4 is used to rate each coating, wherein 1 indicates good resistance, and 4 indicates poor resistance. Preferably, the coating scores 1.

Adhesion (ADH) of the coating to the surface of the plastic substrate is assessed using a cross hatch test. In each case, first, 5 parallel cuts of ~1 cm long, and spaced by ~1 mm, are made in the coating using a knife. Next, 5 parallel cuts of ~1 cm long, and spaced by ~1 mm, are made in the transversal direction. Subsequently, an adhesive tape (Scotch®) was firmly pressed on the cross-cut coating and removed rapidly. Damage to the cross-cut surface area of the coating, that is, due to adhesion loss, is expressed in a 0-5 scale, wherein 5=best adhesion. A good adhesion is preferred to ensure a strong permanent bond between the coating and the surface.

Coatings and Compositions

Content, in parts by mass, of a series of compositions, and analytical results for a series of coatings formed therewith, according to preferred embodiments of the present invention, are summarized in Table A. Table D, Table F, and Table H describe the used fillers. Each of the coatings summarized in this Table has both a score of 1 for soft feel properties, and for chemical resistance, i.e., against sunscreen and DEET.

Coatings and Compositions with Different Concentrations of Curable Polyurethane and Non-Curable Further Polyurethane In a further example, the effect of an amount of PUD 1 in a composition on the properties of the coating was tested. Content, in parts by mass, of a series of compositions, and analytical results for a series of coatings formed therewith are summarized in Table B. Table D and Table F describe the used fillers. The last two rows of the table show the wt % of radiation-curable polyurethane and non-radiation-curable polyurethane as percentage of the total radiation-curable polyurethane and non-radiation-curable polyurethane. It may be observed that, for UV PUD 1, soft feel properties are best when the composition for forming the coating comprises PUD 1. Preferably, the amount of PUD 1 added is, however, not too large. For example, the ratio by mass of UV PUD 1 to PUD is at least 1.5.

Coatings and Compositions with Different Types of Non-Radiation-Curable Further Polyurethane Compound In a further example, the effect of the type of PUD in a composition on the properties of the coating was tested. Content, in parts by mass, of a series of compositions, and analytical results for a series of coatings formed therewith, are summarized in Table C. For each PUD used in the examples, both the soft feel properties and the chemical resistance are favorable.

Coatings and Compositions Wherein Different Types of Polyurethane Particles are Used In a further example, the effect of features of the polyurethane particles on the properties of the coating was tested. Table D summarizes features of the different polyurethane particles tested. Herein, D50 is the median particle diameter (μm). Content, in parts by mass, of a series of compositions, and analytical results for a series of coatings formed therewith, are summarized in Table E. From the examples, it may be observed that in particular the soft feel properties are in a preferred range when the particles are in a range of from 1 to 10 μm.

Coatings and Compositions with Different Types of Polymethyl Urea Resin Particles In a further example, the effect of using different types of particles on the properties of the coating was tested. Table F summarizes features of different particles as used in the examples. Herein, D50 is the median particle diameter (μm). Content, in parts by mass, of a series of compositions, and analytical results for a series of coatings formed therewith, are summarized in Table G. It may be observed that results are better for the polyurethane particles than for the polymethyl urea resin particles. When a mixture is used comprising at least the polyurethane particles, results are also favorable.

Coatings and Compositions with Different Types of Non-Polyurethane Particles

The effect of using different types of particles on the properties of the coating was further tested. Table H summarizes features of different particles that were tested. Herein, D50 is the median particle diameter (μm), and SC indicates the solid content of the form in which the fillers are supplied by the manufacturer. Content, in parts by mass, of a series of compositions, and analytical results for a series of coatings formed therewith, are summarized in Table I. It may be observed that results are better for the polyurethane particles than for other particles, even when the diameter distribution is similar. This clearly indicates the advantageous effect of using polyurethane particles as used in this invention.

Coatings and Compositions Using Different Concentrations of Polyurethane Particles In a further example, the effect of using different amounts of polyurethane particles on the properties of the coating is tested. Content, in parts by mass, of a series of compositions, and analytical results for a series of coatings formed therewith, are summarized in Table J. For compositions comprising more than 20 wt % polyurethane particles, cosmetic properties and homogeneity of the coating are poor. This corresponds to a ratio by mass of polyurethane particles to the sum of non-radiation-curable further polyurethane dispersion and radiation-curable polyurethane dispersion of above 1.0. As mentioned in Table D, Addimat® 8FT is provided in water having a 36 wt % solid content. Thereby, the 10 parts by mass of Addimat® 8FT in composition F13 mentioned in Table E is equivalent to 3.6 wt % polyurethane particles in composition F13. Thereby, from these examples, it appears that a polyurethane particle content of from 3 to 20 wt % of the composition, or when the ratio by mass of polyurethane particles to the sum of water-dispersible non-radiation-curable further polyurethane and radiation-curable polyurethane dispersion is from 0.08 to 1.0, yields the most favorable results.

TABLE A

Test results for coatings formed from different compositions according to embodiments of the present invention

| | F1 | F2 | F3 | F4 | F5 |
|---|---|---|---|---|---|
| UV PUD 1 (Ucecoat ® 2804) | 54.88 | 54.88 | | 54.88 | |
| UV PUD 2 | | | 54.88 | | 54.88 |
| Daotan ® 6490 | 21.95 | 21.95 | | 21.95 | |
| Water | 10.97 | 10.97 | 10.97 | 10.97 | 10.97 |
| Decosphaera Transparent ® HT 8-20 | 10 | 5.18 | 10 | | 5 |
| Pergopak ® M3 | | 2.19 | | | |
| Pergopak ® M5 | | 2.19 | | | |
| MicroTouch ® 850XF | | | | 15 | |
| Orgasol ® 3501 EXD | | | | | 5 |
| Additol ® VXW 390 | 0.88 | 0.88 | 0.88 | 0.88 | 0.88 |
| Additol ® VXW 6580 | 0.88 | 0.88 | 0.88 | 0.88 | 0.88 |
| Omnirad ® 500 | 0.88 | 0.88 | 0.88 | 0.88 | 0.88 |
| Total (g) | 100.44 | 100 | 78.49 | 105.44 | 78.49 |
| Solid fraction | 0.27 | 0.27 | 0.24 | 0.26 | 0.24 |

TABLE A-continued

Test results for coatings formed from different compositions according to embodiments of the present invention

| | F1 | F2 | F3 | F4 | F5 |
|---|---|---|---|---|---|
| Thickness (μm) | 13.6 | 13.66 | 12.43 | 12.96 | 12.43 |
| Soft feel (1: good; 4: poor) | 1 | 1 | 1 | 1 | 1 |
| Sunscreen/DEET (1: good; 4: poor) | 1 | 1 | 1 | 1 | 1 |

TABLE B

Test results for coatings formed from different compositions, wherein different concentrations of curable and non-curable further polyurethane are used

| | F6 | F7 | F2 | F8 | F9 |
|---|---|---|---|---|---|
| UV PUD 1 (Ucecoat ® 2804) | 76.83 | 61.46 | 54.88 | 46.1 | 15.37 |
| Daotan ® 6490 | 0 | 15.37 | 21.95 | 30.73 | 61.46 |
| Water | 10.97 | 10.97 | 10.97 | 10.97 | 10.97 |
| Decosphaera Transparent ® HT 8-20 | 5.18 | 5.18 | 5.18 | 5.18 | 5.18 |
| Pergopak ® M3 | 2.19 | 2.19 | 2.19 | 2.19 | 2.19 |
| Pergopak ® M5 | 2.19 | 2.19 | 2.19 | 2.19 | 2.19 |
| Additol ® VXW 390 | 0.88 | 0.88 | 0.88 | 0.88 | 0.88 |
| Additol ® VXW 6580 | 0.88 | 0.88 | 0.88 | 0.88 | 0.88 |
| Omnirad ® 500 | 0.88 | 0.88 | 0.88 | 0.88 | 0.88 |
| Total (g) | 100 | 100 | 100 | 100 | 100 |
| Solid fraction | 0.27 | 0.27 | 0.27 | 0.27 | 0.27 |
| Thickness (μm) | 13.66 | 13.66 | 13.66 | 13.66 | 13.66 |
| Soft feel (1: good; 4: poor) | 2 | 1.5 | 1 | 1.5 | 3 |
| Sunscreen/DEET (1: good; 4: poor) | 1 | 1 | 1 | 1 | 4 |
| UV PUD 1 wt % | 100 | 80.0 | 71.4 | 60.0 | 20.0 |
| PUD 1 wt % | 0 | 20.0 | 28.6 | 40.0 | 80.0 |

TABLE C

Test results for coatings formed from different compositions according to embodiments of the present invention, for different non-radiation-curable further polyurethane compounds

| | F2 | F10 | F11 |
|---|---|---|---|
| UV PUD 1 (Ucecoat ® 2804) | 54.88 | 54.88 | 54.88 |
| Daotan ® 6490 | 21.95 | | |
| Daotan ® 6491 | | 21.95 | |
| Daotan ® 6493 | | | 21.95 |
| Water | 10.97 | 10.97 | 10.97 |
| Decosphaera Transparent ® HT 8-20 | 5.18 | 5.18 | 5.18 |
| Pergopak ® M3 | 2.19 | 2.19 | 2.19 |
| Pergopak ® M5 | 2.19 | 2.19 | 2.19 |
| Additol ® VXW 390 | 0.88 | 0.88 | 0.88 |
| Additol ® VXW 6580 | 0.88 | 0.88 | 0.88 |
| Omnirad ® 500 | 0.88 | 0.88 | 0.88 |
| Total (g) | 100 | 100 | 100 |
| Solid fraction | 0.27 | 0.26 | 0.27 |
| Thickness (μm) | 13.66 | 13.44 | 13.66 |
| Soft feel (1: good; 4: poor) | 1 | 2 | 1.5 |
| Sunscreen/DEET (1: good; 4: poor) | 1 | 1 | 1 |

TABLE D

Characteristics of polyurethane particles used in examples according to embodiments of the present invention

| | Filler trade name | Supplier | Filler description | D50 (μm) | Tg (° C.) | Oil absorption % |
|---|---|---|---|---|---|---|
| 1 | Decosphaera Transparent ® HT 8-20 | Lamberti | polyurethane beads | 5.0-8.0 | −58 | 70-120 |
| 2 | MicroTouch ® 850XF | Micro Powders, INC. | Highly resilient modified spherical PU beads | 5.0-8.0 | −54 | |
| 3 | Addimat ® 8FT | Lamberti | Polyurethane beads, in water (solid content: 36 wt %) | 5.0-8.0 | −58 | |
| 4 | MicroTouch ® 800F | Micro Powders, INC. | polyurethane spheres | 22-30 | −54 | |
| 5 | MicroTouch ® 800VF | Micro Powders, INC. | polyurethane spheres | 11.0-15.0 | −54 | |
| 6 | Decosphaera Transparent ® 30F | Lamberti | polyurethane beads | 22-30 | −58 | 50-75 |

TABLE E

Test results for coatings formed from different compositions, wherein different types of particles are used

| | F1 | F12 | F13 | F14 | F15 | F16 |
|---|---|---|---|---|---|---|
| UV PUD 1 (Ucecoat ® 2804) | 54.88 | 54.88 | 54.88 | 54.88 | 54.88 | 54.88 |
| Daotan ® 6490 | 21.95 | 21.95 | 21.95 | 21.95 | 21.95 | 21.95 |
| Water | 10.97 | 10.97 | 10.97 | 10.97 | 10.97 | 10.97 |
| Decosphaera Transparent ® HT 8-20 | 10 | | | | | |
| MicroTouch ® 850XF | | 15 | | | | |
| Addimat ® 8FT | | | 10 | | | |
| Micromatte ® 800F | | | | 10 | | |
| Micromatte ® 800VF | | | | | 10 | |
| Deco Transparent ® 30F | | | | | | 10 |
| Additol ® VXW 390 | 0.88 | 0.88 | 0.88 | 0.88 | 0.88 | 0.88 |
| Additol ® VXW 6580 | 0.88 | 0.88 | 0.88 | 0.88 | 0.88 | 0.88 |
| Omnirad ® 500 | 0.88 | 0.88 | 0.88 | 0.88 | 0.88 | 0.88 |
| Total | 100.44 | 105.44 | 100.44 | 90.44 | 90.44 | 90.44 |
| Soft feel (1: good; 4: poor) | 1 | 1 | 2 | 4 | 4 | 4 |
| Sunscreen/DEET (1: good; 4: poor) | 1 | 1 | 1 | 1 | 4 | 1 |

TABLE F

Characteristics of different types of particles used in the examples

| Trade name | Supplier | Filler description | D50 (μm) | Oil absorption % |
|---|---|---|---|---|
| Pergopak ® M3 | Huber | polymethyl urea resin with reactive methylol groups | 6.0-8.5 | Ca. 310 |
| Pergopak ® M5 | Huber | polymethyl urea resin with reactive methylol groups | 3.5-6.0 | Ca. 265 |

TABLE G

Test results for coatings formed from different compositions, wherein different types of particles are used

| | F1 | F17 | F18 | F2 |
|---|---|---|---|---|
| UV PUD 1 (Ucecoat ® 2804) | 54.88 | 54.88 | 54.88 | 54.88 |
| Daotan ® 6490 | 21.95 | 21.95 | 21.95 | 21.95 |
| Water | 10.97 | 10.97 | 10.97 | 10.97 |
| Decosphaera Transparent ® HT 8-20 | 10 | | | 5.18 |
| Pergopak ® M3 | | 10 | | 2.19 |
| Pergopak ® M5 | | | 10 | 2.19 |
| Additol ® VXW 390 | 0.88 | 0.88 | 0.88 | 0.88 |
| Additol ® VXW 6580 | 0.88 | 0.88 | 0.88 | 0.88 |
| Omnirad ® 500 | 0.88 | 0.88 | 0.88 | 0.88 |
| Total | 100.44 | 100.44 | 100.44 | 100 |
| Soft feel (1: good; 4: poor) | 1 | 3 | 2 | 1 |
| Sunscreen/DEET (1: good; 4: poor) | 1 | 1 | 1 | 1 |

TABLE H

Characteristics of different types of particles used in the examples

| Filler trade name | Supplier | Filler description | D50 (μm) | Oil absorption % |
|---|---|---|---|---|
| Lanco ® 6148 | Lubrizol | wax | | |
| Lanco LiquidMatt ® 6375 | Lubrizol | wax-treated silica in water | | |
| Deogrip Micro ® A 2010 | D O G Deutsche Oelfabrik | Radically cross-linked modified castor oil dispersed in water | 10 | |
| Ceridust ® 3715 | Clariant | micronized, polar modified polyethylene wax | 7.5-9.5 | |
| Coatosil ® DSA 6 | Momentive | Silicone dispersion | | |
| Sylysia ® 710 | Fuji Silysia Chemical, LTD. | micronized synthetic amorphous silica-gel | 2.3-3.3 | 90-110 |

TABLE H-continued

| Characteristics of different types of particles used in the examples | | | | |
|---|---|---|---|---|
| Filler trade name | Supplier | Filler description | D50 (μm) | Oil absorption % |
| Ceridust ® 8020 | Clariant | micronized, highly modified copolymer wax | 7.0-9.0 | |
| Orgasol ® 3501 EXD | Arkema | Copolyimide 6/12 | 10 | |

TABLE I

Test results for coatings formed from different compositions, wherein different types of particles are used

| | F19 | F20 | F21 | F22 | F23 | F24 | F25 |
|---|---|---|---|---|---|---|---|
| UV PUD 1 (Ucecoat ® 2804) | 54.88 | 54.88 | 54.88 | 54.88 | 54.88 | 54.88 | 54.88 |
| Daotan ® 6490 | 21.95 | 21.95 | 21.95 | 21.95 | 21.95 | 21.95 | 21.95 |
| Water | 10.97 | 10.97 | 10.97 | 10.97 | 10.97 | 10.97 | 10.97 |
| Lanco ® 6148 | 7 | | | | | | |
| Lanco LiquidMatt ® 6375 | | 10 | | | | | |
| Deogrip Micro ® A 2010 | | | 15 | | | | |
| Ceridust ® 3715 | | | | 10 | | | |
| Coatosil ® DSA 6 | | | | | 5 | | |
| Sylysia ® 710 | | | | | | 10 | |
| Ceridust ® 8020 | | | | | | | 10 |
| Additol ® VXW 390 | 0.88 | 0.88 | 0.88 | 0.88 | 0.88 | 0.88 | 0.88 |
| Additol ® VXW 6580 | 0.88 | 0.88 | 0.88 | 0.88 | 0.88 | 0.88 | 0.88 |
| Omnirad ® 500 | 0.88 | 0.88 | 0.88 | 0.88 | 0.88 | 0.88 | 0.88 |
| Total | 97.44 | 100.44 | 105.44 | 100.44 | 95.44 | 100.44 | 100.44 |
| Soft feel (1: good; 4: poor) | 3 | 3 | 2 | 3 | 4 | 4 | 3 |
| Sunscreen/DEET (1: good; 4: poor) | 1 | 1 | 4 | 1 | 1 | 1 | 1 |

TABLE J

Test results for coatings formed from different compositions, wherein different concentrations of polyurethane particles are used

| | F26 | F27 | F28 | F1 | F29 | F30 | F31 |
|---|---|---|---|---|---|---|---|
| UV PUD 1 (Ucecoat ® 2804) | 54.88 | 54.88 | 54.88 | 54.88 | 51.31 | 47.74 | 44.17 |
| Daotan ® 6490 | 21.95 | 21.95 | 21.95 | 21.95 | 20.52 | 19.09 | 17.66 |
| Water | 10.97 | 10.97 | 10.97 | 10.97 | 10.97 | 10.97 | 10.97 |
| Decosphaera Transparent ® HT 8-20 | 3 | 5 | 7 | 10 | 15 | 20 | 25 |
| Additol ® VXW 390 | 0.88 | 0.88 | 0.88 | 0.88 | 0.88 | 0.88 | 0.88 |
| Additol ® VXW 6580 | 0.88 | 0.88 | 0.88 | 0.88 | 0.88 | 0.88 | 0.88 |
| Omnirad ® 500 | 0.88 | 0.88 | 0.88 | 0.88 | 0.88 | 0.88 | 0.88 |
| Total | 93.44 | 95.44 | 97.44 | 100.44 | 100.44 | 100.44 | 100.44 |
| Soft feel (1: good; 4: poor) | 4 | 2 | 1 | 1 | 1 | 1 | 1 |
| Sunscreen/DEET (1: good; 4: poor) | 1 | 1 | 1 | 1 | 1 | 1 | 1 |

The invention claimed is:

1. An aqueous radiation-curable composition comprising:

a radiation-curable polyurethane dispersion obtained by reacting:

a. a compound comprising at least two isocyanate groups, b. a polyol having a molecular weight of at least 500 g/mol, c. a compound comprising:

at least one group capable of reacting with an isocyanate group, and at least one hydrophilic group, and d. an ethylenically unsaturated compound comprising:

at least one group capable of reacting with an isocyanate group, and at least one ethylenically unsaturated group, and a plurality of polyurethane particles that are not-radiation curable and have a median particle diameter D50 of from 1 to 10 μm, and water;

wherein the aqueous radiation-curable composition further comprises a non-radiation-curable further polyurethane water dispersion obtained by reacting:

i. a compound comprising at least two isocyanate groups, ii. a polyol having a molecular weight of at least 500 g/mol, iii. a compound comprising:

at least one group capable of reacting with an isocyanate group, and at least one hydrophilic group, and iv. a compound comprising at least two amino groups selected from primary amino groups and secondary amino groups; and wherein a mass ratio of the radiation-curable polyurethane dispersion to the non-radiation-curable further polyurethane dispersion in the composition is at least 1.5.

2. The composition according to claim 1, wherein the radiation-curable polyurethane dispersion is obtained by reacting from 10 to 60 parts by mass of compound a., from 1 to 40 parts by mass of compound b., from 2 to 25 parts by mass of compound c., and from 15 to 85 parts by mass of compound d, wherein the parts by mass of compounds a., b., c., and d. sum up to 100.

3. The composition according to claim 1, wherein the compounds that are reacted to obtain the radiation-curable polyurethane dispersion compound additionally comprises a compound e. that is a diol having a molecular weight of at most 400 g/mol.

4. The composition according to claim 1, wherein the compounds that are reacted to obtain the radiation-curable polyurethane dispersion additionally comprise a compound f. comprising at least two amino groups independently selected from primary and secondary amino groups.

5. The composition according to claim 1, wherein the polyol compound b. is a polyester or a polycarbonate.

6. The composition according to claim 1, wherein the polyurethane particles have a median diameter D50 of from 5 to 8 μm.

7. The composition according to claim 1, wherein the non-radiation-curable further polyurethane dispersion represents from 0.1 to 40 wt % of the sum of the masses of the non-radiation-curable further polyurethane dipsersion, the radiation-curable polyurethane dispersion, and the polyurethane particles.

8. The composition according to claim 1, wherein the compounds that are reacted to obtain the non-radiation-curable further polyurethane dispersion additionally comprises a compound v. that is a diol having a molecular weight of less than 500 g/mol.

9. The composition according to claim 1, wherein the polyol compound ii. is a polyester or a polyether.

10. The composition according to claim 1, wherein the plurality of polyurethane particles represents from 3 to 20 wt % of the composition as solid content.

11. The composition according to claim 1, further comprising at least one of the following additives: a catalyst, a polymerization inhibitor, or a photo-initiator.

12. The composition according to claim 1, wherein the Tg of the polyurethane particles is at most 0° C.

13. The composition according to claim 1, wherein an oil absorption of the polyurethane particles is at most 120 gram oil per 100 gram polyurethane particles.

14. A coating formed by curing the composition according to claim 1.

15. A method for forming a coating according to claim 14, comprising:

applying the composition to a surface, and curing of the composition, thereby forming the coating.

16. Use of the coating according to claim 14 for consumer electronics, appliances, automotive interiors and exteriors, packaging, furniture, in-mold decoration, industrial applications, graphical applications, or in-mold labelling.

17. A method for forming an aqueous radiation-curable composition according to claim 1 comprising mixing:

a radiation-curable polyurethane dispersion compound obtained by reacting:

a. a compound comprising at least two isocyanate groups, b. a polyol having a molecular weight of at least 500 g/mol, c. a compound comprising:

at least one group capable of reacting with an isocyanate group, and at least one hydrophilic group, and d. an ethylenically unsaturated compound comprising:

at least one group capable of reacting with an isocyanate group, and at least one ethylenically unsaturated group, and a plurality of polyurethane particles that are not-radiation curable and have a median diameter D50 of from 1 to 10 μm, and water.

* * * * *